United States Patent
Someda et al.

(10) Patent No.: US 9,789,815 B2
(45) Date of Patent: Oct. 17, 2017

(54) NAVIGATION DEVICE, NAVIGATION METHOD, AND COMPUTER PROGRAM PRODUCT

(71) Applicant: KABUSHIKI KAISHA TOSHIBA, Minato-ku, Tokyo (JP)

(72) Inventors: Keiichiro Someda, Kanagawa (JP); Akihiko Enamito, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 71 days.

(21) Appl. No.: 14/977,948

(22) Filed: Dec. 22, 2015

(65) Prior Publication Data

US 2016/0185290 A1    Jun. 30, 2016

(30) Foreign Application Priority Data

Dec. 26, 2014  (JP) .................. 2014-264885

(51) Int. Cl.
| | |
|---|---|
| *B60Q 9/00* | (2006.01) |
| *G01C 21/36* | (2006.01) |
| *B60W 40/08* | (2012.01) |
| *H04S 7/00* | (2006.01) |
| *G06F 3/16* | (2006.01) |

(52) U.S. Cl.
CPC .............. *B60Q 9/00* (2013.01); *B60Q 9/008* (2013.01); *B60W 40/08* (2013.01); *G01C 21/3629* (2013.01); *G06F 3/165* (2013.01); *H04S 7/301* (2013.01); *H04S 7/302* (2013.01); *B60W 2040/0827* (2013.01); *B60W 2540/26* (2013.01); *B60W 2710/30* (2013.01); *H04R 2499/13* (2013.01); *H04S 2400/13* (2013.01)

(58) Field of Classification Search
CPC ........... B60Q 9/00; B60Q 9/008; G06F 3/165; G01C 21/3629; B60W 40/08; B60W 2040/0827; B60W 2540/26; B60W 2710/30; H04S 7/301; H04S 7/302; H04S 2400/13; H04R 2499/13
USPC ...................................................... 701/1, 36
See application file for complete search history.

(56) References Cited

U.S. PATENT DOCUMENTS

| | | | |
|---|---|---|---|
| 5,935,193 A | 8/1999 | Saiki | |
| 8,665,080 B2 * | 3/2014 | Nagamine | B60Q 9/004 116/31 |

(Continued)

FOREIGN PATENT DOCUMENTS

| | | |
|---|---|---|
| JP | 07-160996 | 6/1995 |
| JP | 09-72752 | 3/1997 |

(Continued)

*Primary Examiner* — Jaime Figueroa
(74) *Attorney, Agent, or Firm* — Amin, Turocy & Watson LLP

(57) ABSTRACT

According to an embodiment, a navigation device installed in a vehicle includes an obtainer, a controller, and a reproducer. The obtainer obtains at least one of vehicle information related to the vehicle and driver information related to a driver of the vehicle. The controller controls, based on at least one of the vehicle information and the driver information, localization direction of a playback sound which is to be reproduced for the driver. The reproducer reproduces the playback sound using a three dimensional sound based on control of the localization direction.

6 Claims, 8 Drawing Sheets

(56) References Cited

U.S. PATENT DOCUMENTS

| | | | |
|---|---|---|---|
| 9,036,828 B2* | 5/2015 | Schambeck | H04R 5/02 381/302 |
| 2005/0128106 A1* | 6/2005 | Nakaishi | G01C 21/3629 340/988 |
| 2007/0174006 A1* | 7/2007 | Kusumoto | G01C 21/3629 701/431 |
| 2008/0118074 A1* | 5/2008 | Takada | G01S 19/49 381/17 |
| 2012/0106744 A1 | 5/2012 | Kambe | |
| 2012/0139716 A1* | 6/2012 | Nagamine | B60Q 9/004 340/438 |
| 2012/0250463 A1* | 10/2012 | Endo | G01S 1/725 367/119 |
| 2012/0257767 A1* | 10/2012 | Schambeck | H04R 5/02 381/86 |
| 2012/0314871 A1 | 12/2012 | Koga | |
| 2012/0328108 A1 | 12/2012 | Enamito et al. | |
| 2013/0034253 A1* | 2/2013 | Nakayama | H04S 3/002 381/302 |
| 2013/0251168 A1 | 9/2013 | Takazawa | |
| 2013/0304371 A1* | 11/2013 | Kitatani | G01C 21/206 701/408 |
| 2014/0023211 A1* | 1/2014 | Inou | H04S 7/303 381/302 |
| 2014/0294210 A1* | 10/2014 | Healey | H04S 7/303 381/302 |
| 2015/0248897 A1* | 9/2015 | Nakayama | H04S 7/30 704/270 |
| 2015/0258930 A1* | 9/2015 | Nakayama | H04R 5/023 381/86 |
| 2015/0312695 A1 | 10/2015 | Enamito et al. | |
| 2016/0157041 A1* | 6/2016 | Shiozawa | H04S 7/302 381/302 |

FOREIGN PATENT DOCUMENTS

| | | |
|---|---|---|
| JP | 2006-107148 | 4/2006 |
| JP | 2006-115364 | 4/2006 |
| JP | 2008-096483 | 4/2008 |
| JP | 2008-151766 | 7/2008 |
| JP | 2008-209137 | 9/2008 |
| JP | 2009-176260 | 8/2009 |
| JP | 2010-076530 | 4/2010 |
| JP | 2011-250311 | 12/2011 |
| JP | 2012-215477 | 11/2012 |
| JP | 2013-005021 | 1/2013 |
| JP | 2013-031145 | 2/2013 |
| JP | 2013-198065 | 9/2013 |
| JP | 2014-110566 | 6/2014 |
| JP | 2014-113855 | 6/2014 |
| WO | 2005-090916 | 9/2005 |

* cited by examiner

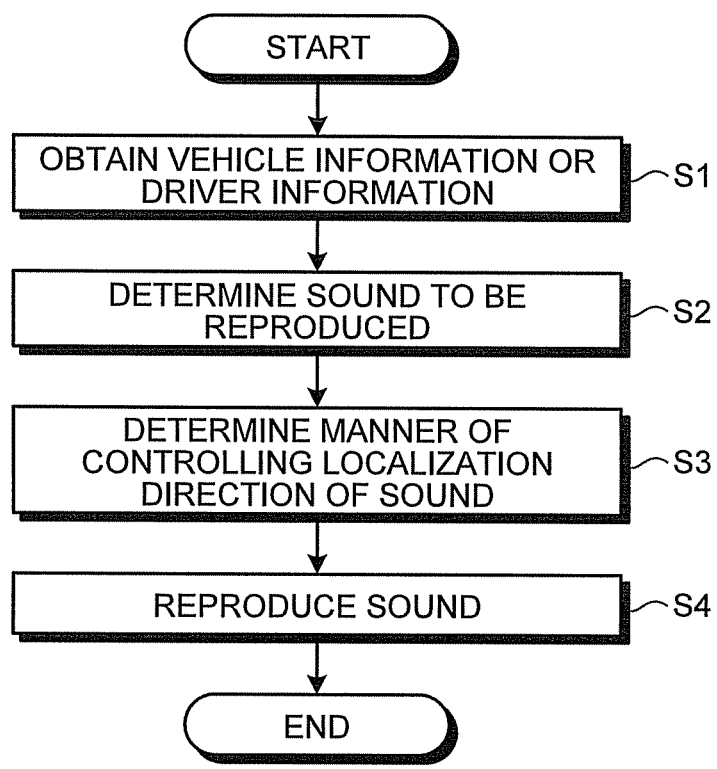

NAVIGATION DEVICE, NAVIGATION METHOD, AND COMPUTER PROGRAM PRODUCT

CROSS-REFERENCE TO RELATED APPLICATIONS

This application is based upon and claims the benefit of priority from Japanese Patent Application No. 2014-264885, filed Dec. 26, 2014, the entire contents of which are incorporated herein by reference.

FIELD

An embodiment described herein relates generally to a navigation device, a navigation method, and a computer program product.

BACKGROUND

Typically, a navigation device is known in which various guiding tones and warning tones are reproduced with the aim of navigating the driver. For example, car navigation includes following navigation for the driver: advance guidance about left and right turns, issuing reminders when approaching tollbooths on expressways, and issuing reminders to encourage deceleration.

However, in the conventional technology, it is difficult for the driver of the vehicle to intuitively understand the meaning of navigation.

BRIEF DESCRIPTION OF THE DRAWINGS

FIG. 8 is a flowchart for explaining an exemplary navigation method according to the embodiment.

DETAILED DESCRIPTION

According to an embodiment, a navigation device installed in a vehicle includes an obtainer, a controller, and a reproducer. The obtainer obtains at least one of vehicle information related to the vehicle and driver information related to a driver of the vehicle. The controller controls, based on at least one of the vehicle information and the driver information, localization direction of a playback sound which is to be reproduced for the driver. The reproducer reproduces the playback sound using a three dimensional sound based on control of the localization direction.

An exemplary embodiment of a navigation device, a navigation method, and a computer program product is described below in detail with reference to the accompanying drawings.

Figure 1:
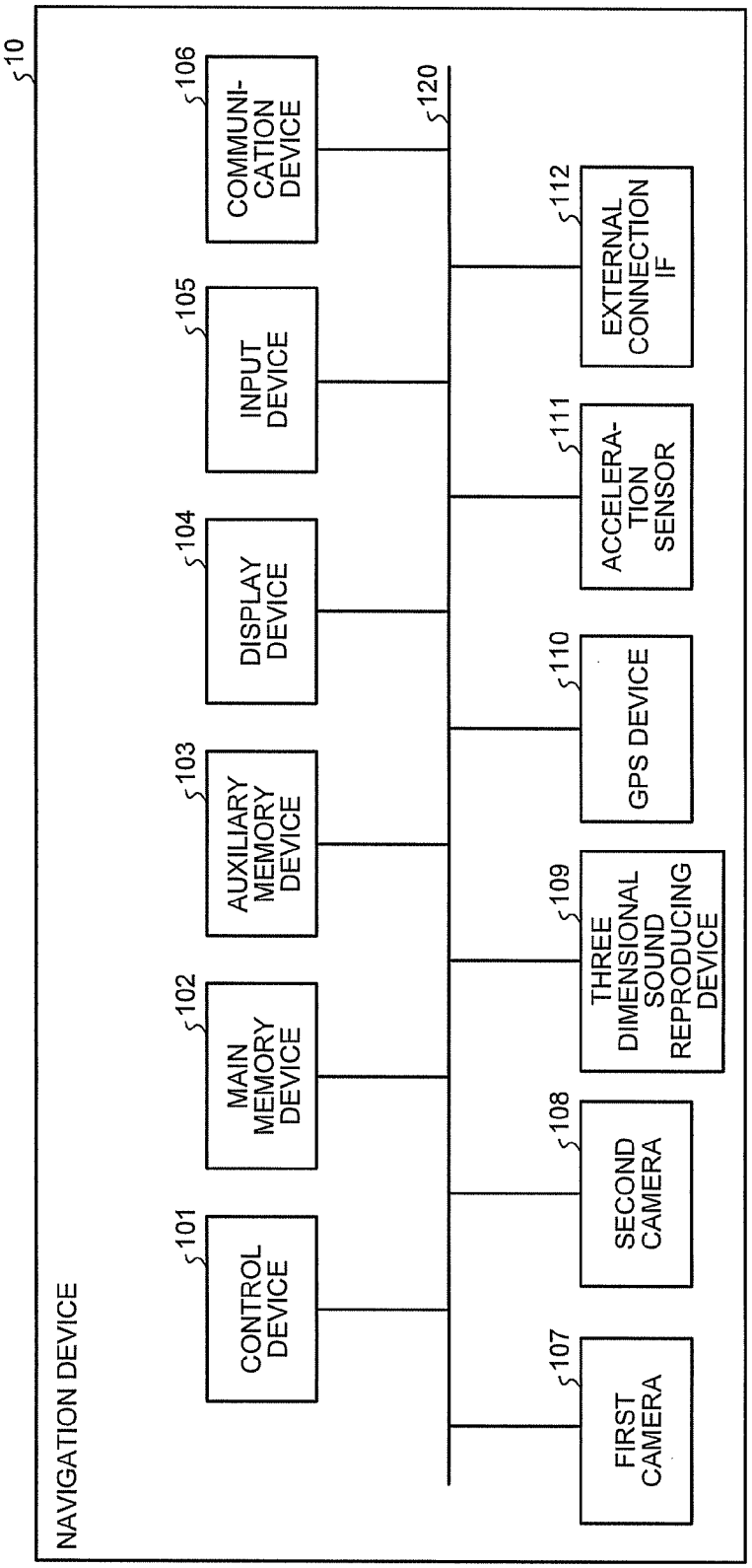
FIG. 1 is a diagram illustrating an exemplary hardware configuration of a navigation device according to an embodiment.

FIG. 1 is a diagram illustrating an exemplary hardware configuration of a navigation device 10 according to an embodiment. The navigation device 10 according to the embodiment includes a control device 101, a main memory device 102, an auxiliary memory device 103, a display device 104, an input device 105, a communication device 106, a first camera 107, a second camera 108, a three dimensional sound reproducing device 109, a GPS device 110 (GPS stands for Global Positioning System), an acceleration sensor 111, and an external connection interface (IF) 112. Herein, the control device 101, the main memory device 102, the auxiliary memory device 103, the display device 104, the input device 105, the communication device 106, the first camera 107, the second camera 108, the three dimensional sound reproducing device 109, the GPS device 110, the acceleration sensor 111, and the external connection IF 112 are connected to each other by a bus 120. Meanwhile, the navigation device 10 according to the embodiment is installed in, for example, a vehicle such as a passenger car.

The control device 101 executes computer programs that are read from the auxiliary memory device 103 and loaded in the main memory device 102. The main memory device 102 is a memory such as a read only memory (ROM) or a random access memory (RAM). The auxiliary memory device 103 can be a hard disk drive (HDD).

The display device 104 displays navigation-related information such as a map. Examples of the display device 104 include a liquid crystal display. The input device 105 is an interface that enables operations of the navigation device 10. Examples of the input device 105 include buttons. Meanwhile, the display device 104 and the input device 105 can alternatively be configured as a touch-sensitive panel having the display function and the input function.

The communication device 106 communicates with other devices. For example, the communication device 106 receives, from other devices, data for updating the computer programs executed in the navigation device 10.

The first camera 107 is a stereo camera that takes images of the surrounding area of the vehicle. For example, the first camera 107 is installed near the rearview mirror of the vehicle and on the back of the vehicle, and takes images of the front side and the backside of the vehicle. The second camera 108 takes images of the face of the driver.

The three dimensional sound reproducing device 109 reproduces a playback sound, which is to be reproduced for the driver of the vehicle, using a three dimensional sound. Herein, the three dimensional sound is achieved by controlling the localization direction of the playback sound. Herein, the localization direction represents the direction in which the driver feels that the sound source is present. The playback sound represents a guiding tone or a warning tone, for example. The guiding tone represents a sound for notifying the driver of the vehicle about the information (such as an advance notice about a left turn or a right turn) during normal times. The warning tone represents a sound for notifying the driver of the vehicle about the information in an emergency and about risk-related information (for example, sudden acceleration, sudden braking, or excessive speeding). A guiding tone or a warning tone includes at least one of a sound effect and sound information. A sound effect is used to prompt the driver of the vehicle to pay attention. For example, a "ding-dong" sound represents a sound effect. The sound information indicates navigation intended for the driver. Given below is the specific explanation of a method for achieving a three dimensional sound.

Generally, as the technology for achieving a three dimensional sound, the 3D surround sound technology and the virtual (stereophonic) sound technology are known.

In the 3D surround sound technology, the balance of volume of a plurality of speakers is varied and a sound having a sense of direction is presented. Thus, in the 3D surround sound technology, the balance of volume of a plurality of speakers is varied so as to control the localization direction of a sound. Hence, in the 3D surround sound technology, the localization direction of a sound represents the direction in which speakers are disposed or the direction in between the speakers. Thus, when a guiding tone or a warning tone intended for the driver is to be output from the backside, it becomes necessary to install at least one or more speakers behind the driver. In the case of most passenger cars, although normally a left-and-right pair of speakers is installed in front of the driver, no speakers are installed behind. Even if some of the passenger cars have speakers installed at the back, the primary objective of the rear speakers is to reproduce excellent sound for the persons sitting on the backseat. Thus, those speakers are not meant for presenting sound to the driver in an effective manner. Thus, in the case in which the three dimensional sound reproducing device 109 reproduces a playback sound, which is to be reproduced for the driver of a passenger car, using a three dimensional sound according to the 3D surround sound technology; it becomes necessary to additionally install a particular kind of rear speaker or to take a special measure such as altering the speaker arrangement.

In the virtual sound technology, an illusion is created that a sound is heard from a direction in which no speakers are installed. Thus, in the virtual sound technology, the localization direction of a sound indicates the position of a virtual sound source. If the virtual sound technology is implemented, even when only a left-and-right pair of speakers is installed in front of the driver, controlling the position of the virtual sound source enables making the driver to hear a sound from an arbitrary localization direction such as from the anterior direction, from the posterior direction, from the left-hand direction, from the right-hand direction, from the upper direction, or from the lower direction. For that reason, in most of the passenger cars, a three dimensional sound can be reproduced by implementing the virtual sound technology without having to take any special measure regarding the speakers. Thus, as a result of implementing the virtual sound technology, it becomes possible to reduce the implementation cost as compared to the 3D surround sound technology. Meanwhile, the virtual sound technology is disclosed in JP-A 2013-031145 (KOKAI), for example.

The three dimensional sound reproducing device 109 can reproduce a playback sound (such as a guiding tone or a warning tone) using a three dimensional sound achieved according to the 3D surround sound technology or using a three dimensional sound achieved according to the virtual sound technology. However, regarding a sound presented using a three dimensional sound achieved according to the 3D surround sound technology, the sense of direction is perceived to have obscurely expanded in between the speakers. On the other hand, regarding a sound presented using a three dimensional sound achieved according to the virtual sound technology, the sense of direction and the sense of distance are generally clear, and the sound is recognizable to the extent of enabling clear indication of the direction of sound. Hence, as compared to a three dimensional sound achieved according to the 3D surround sound technology, a three dimensional sound achieved according to the virtual sound technology has more excellent sense of direction and stereophonic effect.

The GPS device 110 receives signals from a plurality of GPS satellites, and calculates position information of the vehicle in which the navigation device 10 is installed. The acceleration sensor 111 calculates acceleration information of the vehicle in which the navigation device 10 is installed.

The external connection IF 112 is an interface for establishing connection with an in-vehicle network such as a controller area network (CAN). The control device 101 obtains, from the in-vehicle network via the external connection IF 112, speed information of the vehicle and information indicating the orientation of the front wheels of the vehicle. When the acceleration information is also obtainable from the in-vehicle network, the control device 101 can obtain the acceleration information from the in-vehicle network via the external connection IF 112.

Figure 2:
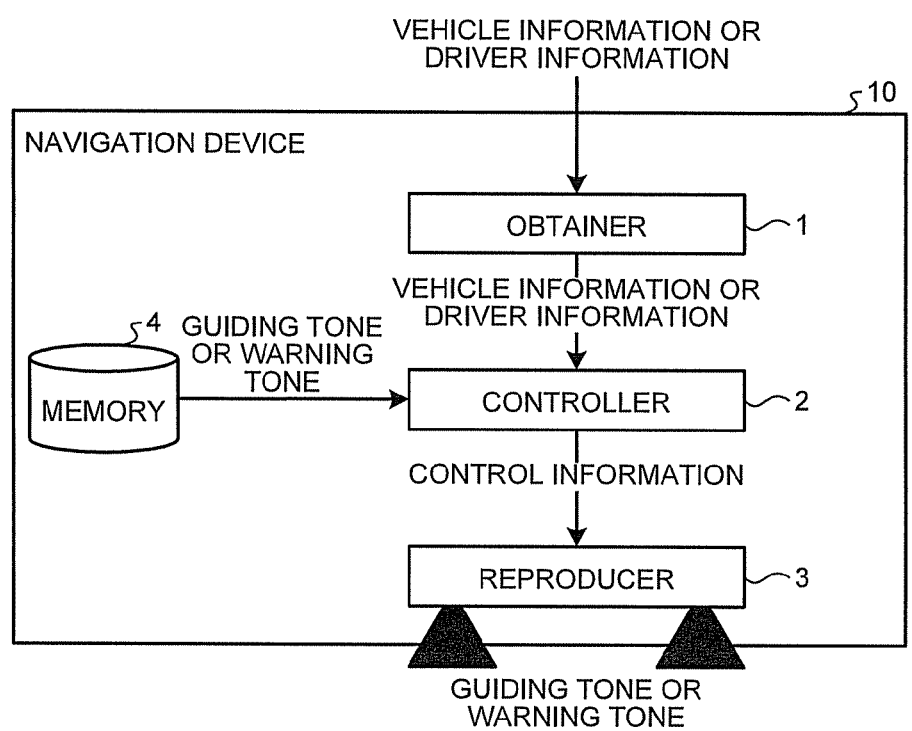
FIG. 2 is a diagram illustrating an exemplary configuration of the navigation device according to the embodiment.

FIG. 2 is a diagram illustrating an exemplary configuration of the navigation device 10 according to the embodiment. The navigation device 10 according to the embodiment includes an obtainer 1, a controller 2, a reproducer 3, and a memory 4. When the control device 101 executes computer programs, the obtainer 1 and the controller 2 are implemented in the main memory device 102. The reproducer 3 corresponds to the three dimensional sound reproducing device 109. The memory 4 corresponds to the auxiliary memory device 103.

The computer programs executed in the navigation device 10 according to the embodiment are recorded as installable or executable files in a computer-readable memory medium such as a compact disk read only memory (CD-ROM), a memory card, a compact disk recordable (CD-R), and a digital versatile disk (DVD); and are provided as a computer program product.

Alternatively, the computer programs executed in the navigation device 10 according to the embodiment can be saved as downloadable files on a computer connected to the Internet or can be made available for distribution through a network such as the Internet.

Still alternatively, the computer programs executed in the navigation device 10 according to the embodiment can be stored in advance in the ROM, which represents the main memory device 102. Meanwhile, either the obtainer 1 or the controller 2 or both can be implemented using hardware such as an integrated circuit (IC) instead of using software (computer programs).

The obtainer 1 obtains at least one of vehicle information related to the vehicle and driver information related to the driver of the vehicle. Examples of the vehicle information include information indicating the situation around the vehicle and information indicating the state of the vehicle. Examples of the driver information include the condition of the driver of the vehicle. More particularly, the obtainer 1 (the control device 101) obtains the vehicle information from the first camera 107, the GPS device 110, the acceleration sensor 111, and the in-vehicle network (the external connection IF 112). Moreover, the obtainer 1 (the control device 101) obtains the driver information from the second camera 108. The obtainer 1 inputs at least one of the vehicle information and the driver information to the controller 2.

Examples of the information indicating the situation around the vehicle include information indicating the situation in front of the vehicle, information indicating the situation behind the vehicle, information indicating the situation on the left-hand side of the vehicle, and information indicating the situation on the right-hand side of the vehicle. Examples of the information indicating the state of the vehicle include information related to the speed of the vehicle and information indicating the orientation of a particular part of the vehicle.

Examples of the information indicating the condition of the driver include information indicating the state of the pupils of the driver and information indicating the position of the head portion of the driver.

Examples of the information indicating the situation in front of the vehicle include information indicating that a traffic jam, a grade crossing, a junction, a tollbooth, an ETC lane (ETC® stands for Electronic Toll Collection system), or an expressway exit is getting closer; and information indicating the distance to the vehicle running ahead.

Examples of the information indicating the situation behind the vehicle include information indicating that an emergency vehicle such as an ambulance is approaching and information indicating the distance from the vehicle running behind. Regarding the determination of whether or not an emergency vehicle is approaching, for example, the GPS device 110 of the navigation device 10 receives, via the communication device 106 from the GPS device installed in the emergency vehicle, position information of the emergency vehicle as identified by the corresponding GPS device. Thus, based on the position information of the vehicle and the position information of the emergency vehicle, the GPS device 110 determines whether or not the emergency vehicle is approaching.

Examples of the information indicating the situation on the left-hand side of the vehicle include information indicating an advance notice about a left turn.

Examples of the information indicating the situation on the right-hand side of the vehicle include information indicating an advance notice about a right turn.

The information related to the speed of the vehicle represents information related to the deceleration and acceleration of the vehicle. Examples of the information related to deceleration of the vehicle include information for instructing the driver of the vehicle to decelerate and information indicating detection of sudden braking of the vehicle. Examples of the information related to acceleration of the vehicle include information for instructing the driver of the vehicle to accelerate and information indicating detection of sudden acceleration such as a jerking motion of the vehicle.

Examples of the information indicating the orientation of a particular part of the vehicle include the orientation of the front wheels (corresponding to the state of the rotation angle of the steering wheel) of the vehicle.

The controller 2 receives at least one of the vehicle information and the driver information from the obtainer 1, and controls the localization direction of a playback sound (such as a guiding tone or a warning tone), which is to be reproduced for the driver of the vehicle, based on at least one of the vehicle information and the driver information. More particularly, from the memory 4, the controller 2 reads, as a sound to be reproduced using the reproducer 3, a playback sound based on at least one of the vehicle information and the driver information. Then, the controller 2 generates control information that contains sound data of the sound to be reproduced using the reproducer 3 and contains information indicating the manner of controlling the localization direction of the sound; and inputs the control information to the reproducer 3.

The reproducer 3 receives the control information from the controller 2, and reproduces a sound using a three dimensional sound that is achieved by varying the localization direction of a playback sound (such as a guiding tone or a warning tone) based on the control information. Given below is the explanation of an example of controlling the localization direction of a playback sound.

Figure 3A:
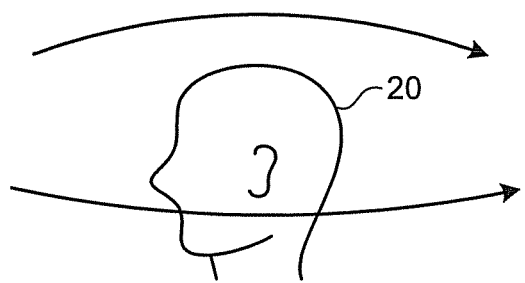
FIG. 3A is a side view illustrating an example of controlling the localization direction of a sound (from the front side to the backside)
Figure 3B:
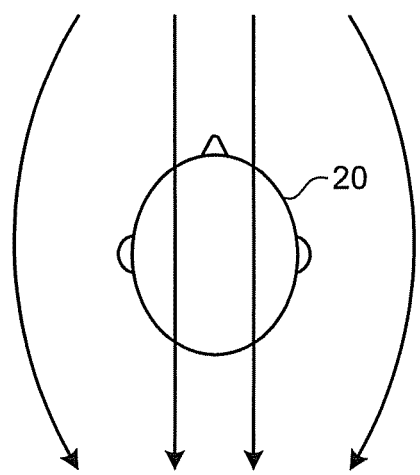
FIG. 3B is a top view illustrating the example of controlling the localization direction of a sound (from the front side to the backside)

FIG. 3A is a side view illustrating an example of controlling the localization direction of a sound (from the front side to the backside). FIG. 3B is a top view illustrating the example of controlling the localization direction of a sound (from the front side to the backside). The example illustrated in FIGS. 3A and 3B is about a case in which, when the obtainer 1 obtains at least one of the information indicating the situation in front of the vehicle and the information related to the deceleration of the vehicle, the controller 2 performs control so that the localization direction of a playback sound moves from the front side to the backside of the driver 20.

For example, to start with, the reproducer 3 varies the localization direction of a longish sound effect, which is at least equal to or longer than two seconds, from the front side to the backside as illustrated in FIGS. 3A and 3B; reproducing the sound effect as a three dimensional sound. Then, in an identical manner to the case of processing the sound effect, the reproducer 3 varies the localization direction of sound information such as "a traffic jam has occurred ahead" from the front side to the backside as illustrated in FIGS. 3A and 3B; reproducing the sound information as a three dimensional sound. As a result, in the mind of the driver 20, there occurs a sense of urgency that something is approaching from the front side. Hence, it becomes possible to make the driver 20 to intuitively understand the meaning of a playback sound (such as a guiding tone or a warning tone). Moreover, it also gives a sense of deceleration to the driver 20. Thus, in the case of reproducing a warning tone for sudden braking or a deceleration sound effect in an electric-powered car, the reproducer 3 controls the localization direction of the warning tone or the deceleration sound effect as illustrated in FIGS. 3A and 3B.

Figure 4A:
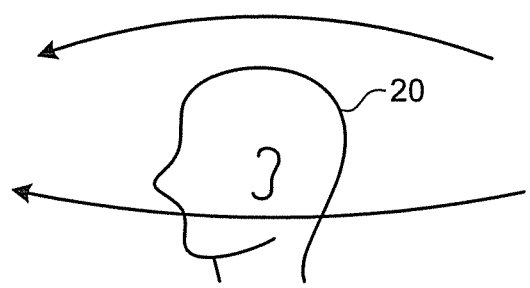
FIG. 4A is a side view illustrating an example of controlling the localization direction of a sound (from the backside to the front side)
Figure 4B:
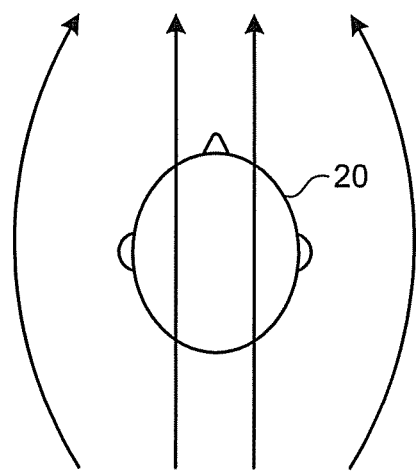
FIG. 4B is a top view illustrating the example of controlling the localization direction of a sound (from the backside to the front side)

FIG. 4A is a side view illustrating an example of controlling the localization direction of a sound (from the backside to the front side). FIG. 4B is a top view illustrating the example of controlling the localization direction of a sound (from the backside to the front side). The example illustrated in FIGS. 4A and 4B is about a case in which, when the obtainer 1 obtains at least one of the information indicating the situation behind the vehicle and the information related to the acceleration of the vehicle, the controller 2 performs control so that the localization direction of a playback sound moves from the backside to the front side of the driver 20.

For example, to start with, the reproducer 3 varies the localization direction of a longish sound effect, which is at least equal to or longer than two seconds, from the backside to the front side as illustrated in FIGS. 4A and 4B; reproducing the sound effect as a three dimensional sound. Then, in an identical manner to the case of processing the sound effect, the reproducer 3 varies the localization direction of sound information such as "an ambulance is approaching from behind" from the backside to the front side as illustrated in FIGS. 4A and 4B; reproducing the sound information as a three dimensional sound. As a result, in the mind of the driver 20, there occurs a sense of urgency that something is approaching from the backside. Hence, it becomes possible to make the driver 20 to intuitively understand the meaning of a playback sound (such as a guiding tone or a warning tone). Moreover, it also gives a sense of acceleration to the driver 20. Thus, in the case of reproducing a guiding tone for encouraging acceleration while merging into an expressway, or reproducing a warning tone in response to the detection of sudden acceleration, or reproducing an acceleration sound effect in an electric-powered car; the reproducer 3 controls the localization direction of the warning tone or the acceleration sound effect as illustrated in FIGS. 4A and 4B.

Given below is the explanation of a case in which the controller 2 controls the localization direction of a playback sound (such as a guiding tone or a warning tone) according to the orientation of a particular part of the vehicle, and accordingly the reproducer 3 reproduces the playback sound as a three dimensional sound. Herein, although any particular part of the vehicle can be taken into account, the specific explanation is given for a case in which the particular part is a front wheel.

Figure 5A:
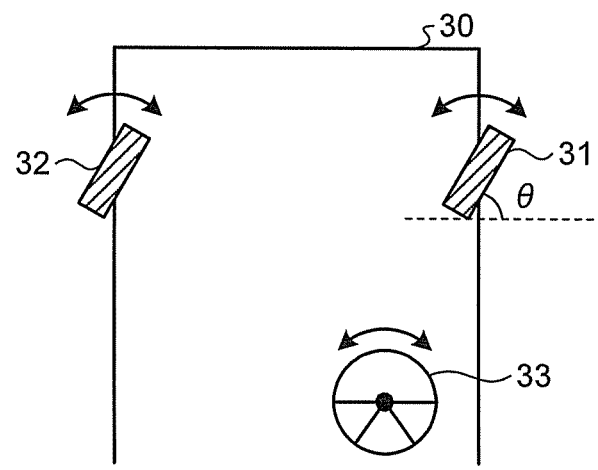
FIG. 5A is a diagram indicating an exemplary orientation of front wheels of a vehicle.

FIG. 5A is a diagram indicating an exemplary orientation of a front wheel 31 (a front wheel 32) of a vehicle 30. In the example illustrated in FIG. 5A, when the driver 20 of the vehicle 30 operates a steering wheel 33, the front wheels 31 and 32 of the vehicle 30 change the orientation (by an angle θ).

Figure 5B:
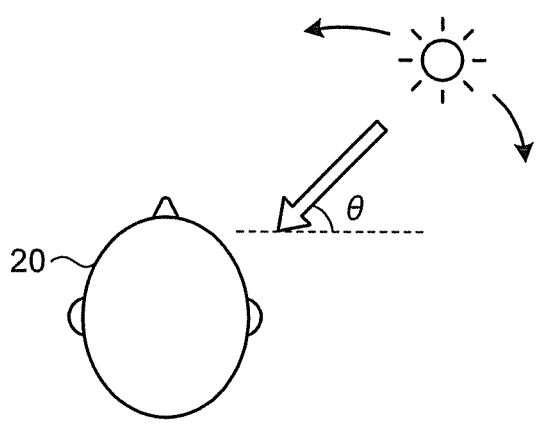
FIG. 5B is a diagram illustrating an example of controlling the localization direction of a sound according to the embodiment based on the orientation of the front wheels of the vehicle.

FIG. 5B is a diagram illustrating an example of controlling the localization direction of a sound according to the embodiment based on the orientation of the front wheel 31 (the front wheel 32) of the vehicle 30. In the example illustrated in FIG. 5B, when the obtainer 1 obtains vehicle information indicating the orientation of a particular part (the front wheel 31 or the front wheel 32) of the vehicle 30, the controller 2 controls the localization direction of a playback sound (for example, a guiding tone or a warning tone) based on the orientation of the particular part (the front wheel 31 or the front wheel 32). More particularly, the controller 2 varies the localization direction of a playback sound in accordance with the angle θ of the front wheel 31 (the front wheel 32), and accordingly the reproducer 3 reproduces the playback sound as a three dimensional sound. Thus, when the state of the orientation of a particular part, such as a front wheel of the vehicle 30, which is difficult for the driver 20 of the vehicle 30 to visually confirm, is notified using a playback sound (such as a guiding tone or a warning tone); it becomes possible to make the driver 20 of the vehicle 30 understand the state in a more intuitive manner. Examples of the playback sound at that time include a sound effect such as a sign tone or an indicator tone.

More particularly, for example, while parking the vehicle 30 or while putting the vehicle 30 into a garage, when the driver 20 of the vehicle 30 operates the steering wheel 33, the controller 2 follows the orientation of the front wheel 31 (or the front wheel 32) and performs control in such a way that the driver 20 of the vehicle 30 hears a playback sound (such as a guiding tone or a warning tone) from the same direction as the orientation of the front wheel 31 (or the front wheel 32). As a result, the current state of the orientation of the front wheel 31 (or the front wheel 32) can be notified to the driver 20 of the vehicle 30 in a more intuitive manner. Meanwhile, if the vehicle is a forklift, the localization direction of a playback sound can be set according to the orientation of the rear wheels instead of the front wheels.

Figure 6A:
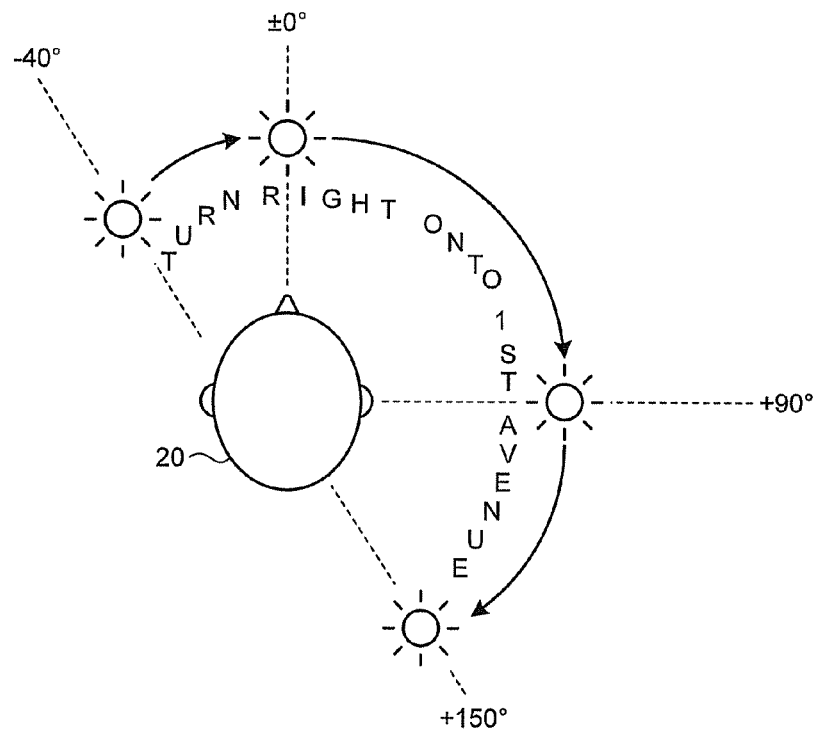
FIG. 6A is a top view illustrating an example of controlling the localization direction of a sound according to the embodiment based on the information indicating the situation on the right-hand side of the vehicle.

FIG. 6A is a top view illustrating an example of controlling the localization direction of a sound according to the embodiment based on the information indicating the situation on the right-hand side of the vehicle. In the example illustrated in FIG. 6A, when the obtainer 1 obtains the information indicating the situation on the right-hand side of the vehicle, the controller 2 performs control in such a way that the localization direction of a playback sound (such as a guiding tone or a warning tone) moves from the opposite side front of the direction of instruction (from the vicinity of −40°) up to the backside in the direction of instruction (up to the vicinity of +150°) via the front side (±0°) and the direction of instruction (+90°).

For example, to start with, the reproducer 3 varies the localization direction of a longish sound effect, which is at least equal to or longer than two seconds, as illustrated in FIG. 6A; reproducing the sound effect as a three dimensional sound. Then, in an identical manner to the case of processing the sound effect, the reproducer 3 varies the localization direction of sound information such as "turn right onto 1st Avenue" as illustrated in FIG. 6A; reproducing the sound information as a three dimensional sound.

Figure 6B:
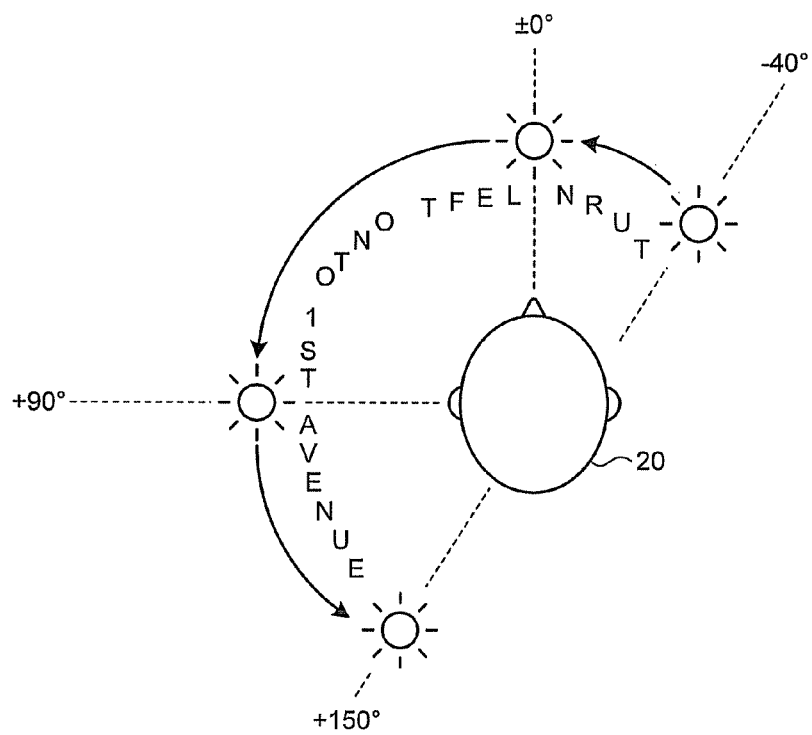
FIG. 6B is a top view illustrating an example of controlling the localization direction of a sound according to the embodiment based on information indicating the situation on the left-hand side of the vehicle.

FIG. 6B is a top view illustrating an example of controlling the localization direction of a sound according to the embodiment based on information indicating the situation on the left-hand side of the vehicle. In the example illustrated in FIG. 6B, when the obtainer 1 obtains the information indicating the situation on the left-hand side of the vehicle, the controller 2 performs control in such a way that the localization direction of a playback sound (such as a guiding tone or a warning tone) moves from the opposite side front of the direction of instruction (from the vicinity of −40°) up to the backside in the direction of instruction (up to the vicinity of +150°) via the front side (±0°) and the direction of instruction (+90°).

For example, to start with, the reproducer 3 varies the localization direction of a longish sound effect, which is at least equal to or longer than two seconds, as illustrated in FIG. 6B; reproducing the sound effect as a three dimensional sound. Then, in an identical manner to the case of processing the sound effect, the reproducer 3 varies the localization direction of sound information such as "turn left onto 1st Avenue" as illustrated in FIG. 6B; reproducing the sound information as a three dimensional sound.

Given below is the explanation of the reason for varying the localization direction of a playback sound (such as a guiding tone or a warning tone) from the opposite side front of the direction of instruction (from the vicinity of −40°) up to the backside in the direction of instruction (up to the vicinity of +150°) via the front side (±0°) and the direction of instruction (+90°), instead of varying the localization direction of a playback sound from the front side (±0°) up to the direction of instruction (+90°). The reason is that the playback sound based on a three dimensional sound tends to have a weak sense of direction in the front side (±0°), but the sound in the left-right-hand direction tends to have a favorable sense of direction. Moreover, the reason is that, greater the amount of movement in the localization direction of a sound, easier it is to understand the variation in the direction of the playback sound and more is the tendency to have a favorable recognition of the sense of direction. Thus, the controller 2 controls the localization direction of the playback sound as illustrated in FIGS. 6A and 6B so as to make it possible for the driver 20 to understand the travelling direction in a more intuitive manner.

Meanwhile, while controlling the localization direction of a sound in the case in which a playback sound (such as a guiding tone or a warning tone) indicates the direction of instruction during an advance notice about left and right turns, the controller 2 does not take into account the minute differences in the directions of actual roads and only roughly distinguishes between "left turns" and "right turns". That is, the controller 2 does not perform complex operations such as precisely matching the direction of instruction to the direction of the actual road.

Meanwhile, although it is desirable to have a longish sound effect at least equal to or longer than two seconds, even if the sound effect has the length shorter than two seconds, it is still possible to make the driver 20 intuitively understand the travelling direction by varying the localization direction of a playback sound (such as a guiding tone or a warning tone) from the opposite side front of the direction of instruction (from the vicinity of −40°) up to the backside in the direction of instruction (up to the vicinity of +150°) via the front side (±0°) and the direction of instruction (+90°).

Given below is the explanation about an example of effectively controlling the localization direction at the time of warning the driver using a warning tone.

Figure 7A:
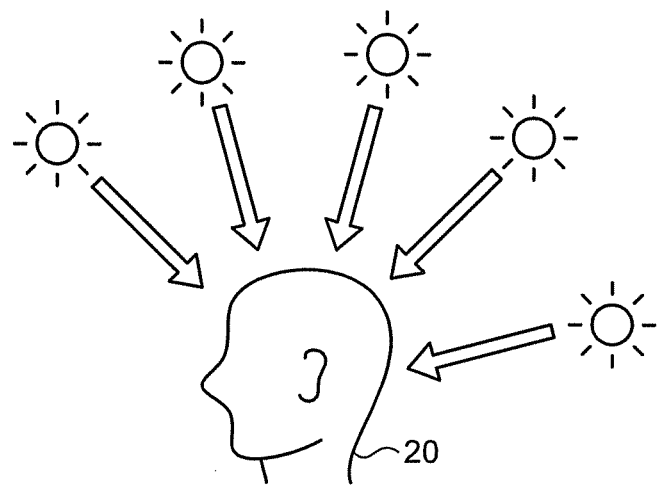
FIG. 7A is a side view illustrating an example of controlling the localization direction of a sound according to the embodiment at the time of warning the driver.
Figure 7B:
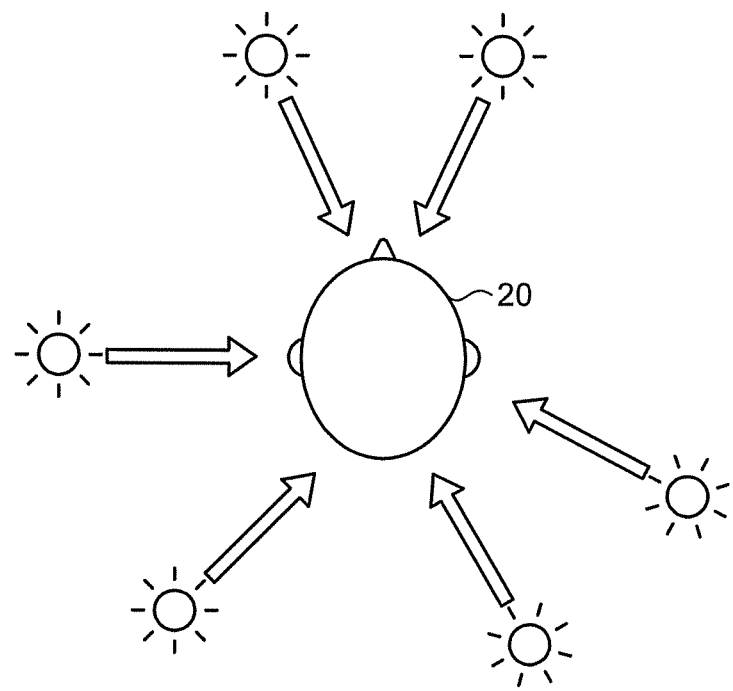
FIG. 7B is a top view illustrating the example of controlling the localization direction of a sound according to the embodiment at the time of warning the driver.

FIG. 7A is a side view illustrating an example of controlling the localization direction of a sound according to the embodiment at the time of warning the driver 20. FIG. 7B is a top view illustrating the example of controlling the localization direction of a sound according to the embodiment at the time of warning the driver 20. The example illustrated in FIGS. 7A and 7B is about controlling the localization direction of a warning tone in the case in which the obtainer 1 obtains the information indicating the condition of the driver 20 and the controller 2 determines from the information indicating the condition of the driver 20 that the driver is probably dozing off. More particularly, the controller 2 performs control in such a way that the driver 20 hears the warning tone from different random localization directions on the upper side of the driver 20.

That is because of the following reason. In a natural situation, there is almost no sound heard from above. Hence, when a sound is heard from above, the driver 20 can immediately recognize that the sound is artificial, and it results in evoking a sense of discomfort in the mind of the driver 20 and giving the driver 20 a strong sense of warning. As the warning tone, it is possible to use, for example, the sound of a siren that would evoke the sense of warning in the driver 20. However, in order to prevent false recognition, it is desirable to use a different siren than the siren of an emergency vehicle such as a police car or an ambulance.

Meanwhile, regardless of whether the vehicle information (the driver information) is information indicating the situation in front of the vehicle (the driver 20), or information indicating the situation behind the vehicle (the driver 20), or information indicating the situation on the left-hand side of the vehicle (the driver 20), or information indicating the situation on the right-hand side of the vehicle (the driver 20); when a strong sense of warning is to be given to the driver 20, the localization direction of the warning tone can be controlled as illustrated in FIGS. 7A and 7B.

Regarding the determination from the information indicating the condition of the driver 20 (i.e., from the information indicating the state of the pupils of the driver 20 and the information indicating the position of the head portion of the driver 20) that the driver is probably dozing off, since the specific method is already, the detailed explanation is not given herein.

Given below is the explanation of a navigation method implemented in the navigation device 10 according to the embodiment.

FIG. 8 is a flowchart for explaining an exemplary navigation method according to the embodiment. Firstly, the obtainer 1 obtains at least one of the vehicle information and the driver information (Step S1). Then, based on at least one of the vehicle information and the driver information, the controller 2 determines a sound to be reproduced using the reproducer 3 (Step S2). More particularly, from the memory 4, the controller 2 reads sound data of playback sounds (such as guiding tones or warning tones) based on at least one of the vehicle information and the driver information, and determines the sound to be reproduced using the reproducer 3. Then, based on at least one of the vehicle information and the driver information, the controller 2 determines the manner of controlling the localization direction of the sound (such as a guiding tone or a warning tone) to be reproduced using the reproducer 3 (Step S3). Subsequently, the controller 2 controls the localization direction of the sound (such as a guiding tone or a warning tone), which is determined at Step S2, according to the manner of controlling the localization direction as determined at Step S3; with the reproducer 3 reproducing the sound (such as a guiding tone or a warning tone) using a three dimensional sound (Step S4).

As described above, in the navigation device 10 according to the embodiment, the obtainer 1 obtains at least one of the vehicle information related to the vehicle and the driver information related to the driver of the vehicle. Then, based on at least one of the vehicle information and the driver information, the controller 2 controls the localization direction of a playback sound that is to be reproduced for the driver. Subsequently, the reproducer 3 reproduces the playback sound using a three dimensional sound based on the control of the localization direction. As a result, in the navigation device 10 according to the embodiment, it becomes possible to make the driver of the vehicle to intuitively understand the meaning of navigation.

Moreover, in the navigation device 10 according to the embodiment, for example, even when a low-tone noise such as the driving noise is loud, it is possible to make the driver to intuitively understand the information indicating dangers in the travelling direction and information about reminders. Moreover, for example, using a playback sound (such as a guiding tone or a warning tone) that changes the sense of direction in tandem with the orientation of a particular part of the vehicle, it becomes possible to notify the driver about the orientation that is difficult to visually confirm. Furthermore, even if various warnings and reminders are issued to the driver, he or she becomes able to easily distinguish whether the issued reminder is related to the direction ahead, or the issued reminder is related to the direction behind, or the issued warning is not particularly related to the direction ahead or the direction behind. That enables the driver to intuitively understand the meaning of a playback sound (such as a guiding tone or a warning tone). Moreover, when various warnings or reminders are issued to the driver using warning tones, it is a stronger and more effective way of issuing warnings or reminders.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A navigation device installed in a vehicle, comprising:
   an obtainer configured to obtain at least one of vehicle information related to the vehicle and driver information related to a driver of the vehicle from at least one of a camera, a Global Positioning System (GPS) device, an acceleration sensor, and an in-vehicle network;
   a controller configured to control, based on at least one of the vehicle information and the driver information, localization direction of a playback sound which is to be reproduced for the driver; and
   a reproducer configured to reproduce the playback sound using a three dimensional sound based on control of the localization direction, wherein
   when the vehicle information represents at least one of information indicating a situation in front of the vehicle and information related to the deceleration of the vehicle, the controller performs control in such a way that the localization direction of the playback sound moves from front side to backside of the driver.

2. A navigation device installed in a vehicle, comprising:
   an obtainer configured to obtain at least one of vehicle information related to the vehicle and driver information related to a driver of the vehicle;
   a controller configured to control, based on at least one of the vehicle information and the driver information, localization direction of a playback sound which is to be reproduced for the driver; and
   a reproducer configured to reproduce the playback sound using a three dimensional sound based on control of the localization direction, wherein,
   when the vehicle information represents at least one of information indicating a situation behind the vehicle and information related to acceleration of the vehicle, the controller performs control in such a way that the localization direction of the playback sound moves from backside to front side of the driver.

3. A navigation device installed in a vehicle, comprising:
   an obtainer configured to obtain at least one of vehicle information related to the vehicle and driver information related to a driver of the vehicle;
   a controller configured to control, based on at least one of the vehicle information and the driver information, localization direction of a playback sound which is to be reproduced for the driver; and
   a reproducer configured to reproduce the playback sound using a three dimensional sound based on control of the localization direction, wherein,
   when the vehicle information indicates an orientation of a particular part of the vehicle, the controller controls the localization direction of the playback sound so as to generally fit the orientation of the particular part.

4. The device according to claim 3, wherein the particular part is a front wheel of the vehicle.

5. The device according to claim 1, wherein
   when the vehicle information is related to left-hand side or right-hand side of the vehicle, the controller performs control in such a way that the localization direction of the playback sound moves from an opposite-side front of a direction of instruction to backside in the direction of instruction via front side and via the direction of instruction, and
   the reproducer achieves the three dimensional sound using a virtual sound technology.

6. The device according to claim 1, wherein, when the driver information represents information indicating a condition of the driver and when it is determined from the information indicating the condition of the driver that the driver is probably dozing off, the controller performs control in such a way that the driver hears the playback sound from different random localization directions on the upper side of the driver.

* * * * *